United States Patent [19]
Sakurai et al.

[11] Patent Number: 5,795,539
[45] Date of Patent: Aug. 18, 1998

[54] METHOD FOR COOLING GRAPHITE ELECTRODES USED FOR METAL MELTING AND REFINING IN AN ELECTRIC ARC FURNACE AND A LADLE

[75] Inventors: Fumiyoshi Sakurai, Toyama-ken; Norio Nagai, Tokyo-to, both of Japan

[73] Assignee: Nippon Carbon Co., Ltd., Tokyo, Japan

[21] Appl. No.: 721,221

[22] Filed: Sep. 26, 1996

[30] Foreign Application Priority Data

| | | | |
|---|---|---|---|
| Sep. 26, 1995 | [JP] | Japan | 7-271907 |
| Sep. 26, 1995 | [JP] | Japan | 7-271908 |
| Sep. 26, 1995 | [JP] | Japan | 7-271909 |
| Sep. 26, 1995 | [JP] | Japan | 7-271910 |
| Sep. 26, 1995 | [JP] | Japan | 7-271911 |

[51] Int. Cl.$^6$ .................................................. C21B 7/10
[52] U.S. Cl. .................................... 266/46; 373/96
[58] Field of Search ........................... 266/192, 241, 266/46; 373/93, 96, 95

[56] References Cited

U.S. PATENT DOCUMENTS

| 4,416,014 | 11/1983 | Hogg, Jr. et al. | 373/93 |
| 4,941,149 | 7/1990 | Nakamoto et al. | 373/96 |

*Primary Examiner*—Scott Kastler
*Attorney, Agent, or Firm*—Sughrue, Mion, Zinn, Macpeak & Seas, PLLC

[57] ABSTRACT

This invention concerns a method for water-cooling directly a vertical train of graphite electrodes connected to each other, by using a cooling water sprayed directly onto the outer periphery surface of at least one graphite electrode consisting of an upper portion of graphite electrode train, in which the cooling water is directed at the upward or downward inclination with respect to the horizontal level and said cooling liquid is sprayed simultaneously at a flow rate ranging between 0.8 liters/minute and 40 liters/minute.

4 Claims, 6 Drawing Sheets

METHOD FOR COOLING GRAPHITE ELECTRODES USED FOR METAL MELTING AND REFINING IN AN ELECTRIC ARC FURNACE AND A LADLE

TECHNICAL FIELD

This invention relates a method for cooling graphite electrodes used for metal melting and refining, such as steel making, in an electric arc furnace and a ladle for receiving a molten metal discharged from the electric arc furnace, more especially to a method, in which graphite electrodes, which participate in metal melting and refining by using arc heating of the electric arc furnace or the ladle, are cooled by means of spraying directly a cooling liquid, such as water or the like, onto the outer periphery surface of at least one graphite electrode.

BACKGROUND TECHNIQUES

Conventionally, for melting and refining such as steel making in an electric arc furnace and in a ladle in which molten steel discharged from an electric arc furnace is received and further molten and secondarily refined, an arc heating by using a graphite electrode has been used. The reduction of electric energy cost and reduction of electrode comsuption rate to the smallest possible degree by suppression of oxidative ablation of the end and peripheral surface of a graphite electrode are desired for the melting and refining of metal. As a measure to suppress the oxidative ablation, there have been proposed and applied some means, in which a graphite electrode heated to a high temperature during melting and refining is cooled to suppress the oxidative ablation. One of the cooling method is such that non-ablation electrode, which is permitted to be water-cooled and, which is connected to the upper parts of a graphite electrode train consisting of graphite electrodes successively connected, is water-cooled and then the water cooling effect of the non-ablation electrode is conducted to the graphite electrode connected through nipples to the bottom end of the non-ablation electrode,thereby suppressing the oxidative ablation of the graphite electrodes during melting and refining. For example, U.S. Pat. No. 4,416,014, No. 4,417,344 and No. 4,451,926 disclose that water-cooled non-ablation electrode has therein aluminum-made hollow cylinder, in which cooling water is introduced to cool the surfaces of the inner wall of the hollow cylinder and the bottom end of the non-ablation electrode and finally to cool graphite electrodes connected to the bottom end of the non-ablation electrode.

Japanese Patent Laid-Open No. 60-501879 and Japanese Patent Laid-Open No. 60-501880 disclose a non-ablation electrode permitted to be water-cooled, which comprises a graphite-made tubular body. The graphite-made tubular body has therein a central hole, through which cooling water is introduced to cool the surface of a wall and bottom end of the tubular body and finally to cool a graphite electrode connected to the bottom of the tubular body.

By cooling a non-ablation electrode as described above, a graphite electrode connected to the bottom end of the non-ablation electrode is cooled, thereby suppressing the oxidative ablation to some extent.

However, though the graphite electrode is cooled through the non-ablation electrode connected to the bottom end thereof, the zone, to which the cooling by non-ablation electrode may be affected, is limited to only the connected end surface between the graphite electrode and non-ablation electrode to be connected, and therefore the cooling efficiency is extremely low. Furthermore, the thermal conductivity of graphite itself decreases in a temperature region above about 100° C., and therefore it is difficult to cool as is expected even the lower portion of the graphite electrode which participates in melting and refining.

When a graphite electrode is disconnected from a non-ablation electrode, for example, a used electrode is transferred to an off-line place spaced from an arc electric furnace to be detached from a nipple, and even the nipple is detached from the non-ablation electrode at need.

For connecting a new graphite electrode, a nipple is fixed to a non-ablation electrode, to which a new graphite electrode is fixed through the nipple already fixed, and thus the new graphite electrode is connected.

Therefore, in the case where a non-ablation electrode permitted be water-cooled is used for cooling a graphite electrode, the graphite electrode is transferred to an off-line place so as to be renewed, and then hard labor for detaching and connecting works is required, and the operation is complicated consequently. Repeated detaching and connecting of a graphite electrode causes the deformation, collapse, and damage of screw threads of the graphite electrode, non-ablation electrode, and nipple, with the result that connection failure and increase of electrical resistivity, etc. are occured, and thus the melting and refining operation is affected adversely.

In view of these disadvantages, Japanese Utility Model Publication No. 59-23357 discloses a cooling apparatus which, without using a non-ablation electrode permitted to be water-cooled, cools a graphite electrode by spraying cooling water onto the surface of the graphite electrode projected upwardly from a furnace cover of an arc electric furnace, in order to directly cool the graphite electrode connected through a nipple.

In the cooling apparatus shown in FIG. 1, a graphite electrode train is inserted movably in the vertical direction through the furnace cover 1 which closes the open portion of the arc electric furnace. The graphite electrode train has an upper electrode 2, of which the bottom is connected successively to the lower graphite electrodes through nipples (not shown in the figure).

In the one graphite electrode train, the lower graphite electrode is in the arc electric furnace, and the graphite electrode in the arc electrode furnace takes part in a refining melting for steel making. Above the furnace cover 1, the upper graphite electrode 2 is held by an electrode holder 3, and on the lower side of the electrode holder 3, an annular tube 4 is provided surrounding the upper graphite electrode 2.

From the annular tube 4, a plurality of vertical pipes 5 are projected vertically, the inside of which are provided with nozzles 6 facing to the surface of the graphite electrode 2 to be cooled. Therefore, cooling water introduced in the annular tube 4 moves down along each vertical pipe 5, and cooling water is sprayed from the nozzles 6 on the inside of the pipe 5 onto the peripheral surface of the upper graphite electrode 2.

However, in this cooling apparatus, cooling water is jetted from each nozzle 6 to horizontal level or in the direction parallel to it. For this reason, a large amount of cooling water is mostly reflected and splashed when it strikes on the peripheral surface of the graphite electrode 2, and therefore splashed cooling water increases in a remarkable amount. The splashed cooling water causes serious staining and damage of the electrode holder 3 and furnace cover 1, and therefore this method is can not be put to practical use.

Particularly, the furnace cover 1 consists mostly of refractory such as chamotte, and therefore the refractory is stained and damaged seriously.

The colliding or striking cooling water 7 is mostly reflected and scarecely flows down along the graphite electrode 2. Therefore, the cooling space to be cooled by the cooling water 7 is limited to only the portion of the graphite electrode where the cooling water collides, so that it can not cool the bottom graphite electrode which takes part in melting and refining in the electric furnace unless supply of cooling water is increased extraordinarily. Furthermore, the electric power consumption rate and electrode consumption rate are not reduced as desired, and therefore the increased cooling water supply is very uneconomical.

The increased cooling water supply causes the entering of splashed cooling water into the arc electric furnace, with the result that it affects adversely on reaction in the furnace. Hydrogen gas generated by water reaction in the furnace is apt to be dissolved in molten steel, and is an unsuitable element, in melting and refining of a type of steel which is apt to be easily damaged by hydrogen embrittlement. Therefore, the apparatus shown in FIG. 1 can neither be used for cooling of a graphite electrode in an arc electric furnace, nor be used for cooling of a graphite electrode in a ladle for receiving molten steel after steel making process.

The cooling efficiency of a graphite electrode 2 is low unless the plurality of vertical pipes 5 projected downwardly from the annular tube 4 are extremely long. For this reason, when a cooling apparatus is detached for replacement of electrodes, the long vertical pipes 5 causes troubles and handling is extremely difficult, and therefore it is impossible to put it to practical use.

Electromagnetic force generated around the periphery of the graphite electrode 2 by the annular tube 4 is shielded, so that significant portion of a current which flows to the graphite electrode 2 is shutt off, and thereby an operational problem is caused.

In the case where cooling liquid is sprayed onto a graphite electrode to cool, the method involves the problems described hereinafter.

At least a part of cooling water splashed out of cooling water sprayed onto a graphite electrode enters inevitably a part of an arc electric furnace, and the cooling water which enters the arc electric furnace is then subjected to a high temperature condition to generate hydrogen by water gas reaction. Hydrogen dissolution in molten steel causes hydrogen embrittlement. Such a problem is concerned from the beginning depending on a type of steel to be molten and refined.

For this reason, for making of a type of steel for which high toughness is seriously required, it is seriously desired to reduce electrode consumption rate. A cooling apparatus shown in FIG. 1 has not been practically applied to an arc electric furnace for steel making, though the cooling method in which cooling liquid is directly sprayed onto a graphite electrode has been known as one of the effective measures meeting the above demand.

Further, though it is preferable to cool a graphite electrode by spraying cooling liquid for prevention of oxidative ablation and reduction of electric power consumption rate, excessive cooling of the graphite electrode causes accordingly a consumption of extra electric power, causes increased electric power consumption rate, and causes unpreferably significant cost-up.

In view of overcoming these disadvantages, the applicants had presented a method for water-colling the graphite train without loss of cooling water supply, as shown in U.S. Pat. No. 4,941,149. The method concerns a method and refining metals, in which a liquid coolant to be jetted on peripheral surface of the graphite electrode train is directed to the upward or downward direction at the inclination angle with a range from 10 degrees to 35 degrees.

In the melting and refining method, when the cooling liquid is jetted on the outer peripheral surface of the graphite electrode, the jetting rate of the cooling liquid is in a range between 0.8 liters/min. and 6.0 liters/min., and hence a film of the cooling liquid can be formed by a manner, such that the film is in a state of adhering on the outer peripheral surface of the graphite electrode, along which the film flows down.

The cooling liquid film enables the outer peripheral surface of the graphite electrode to be cooled. The cooling space to be affected by the cooling liquid is not limited to a local portion of the outer peripheral surface of the graphite electrode.

However, the recent steel making process has a tendency to utilize a high power graphite electrode with large diameter, which necessiates a large amount of cooling liquid. Accordingly, in the recent process, the flow rate ranging between 0.8 liters/min. and 6.0 liters/min. is short. The shortage in view of flow rate of the cooling liquid causes an adverse affection on the consumption due to the oxidative ablation of the graphite electrode.

DISCLOSURE OF THE INVENTION

The present invention is related to a method of cooling a vertical train of graphite electrodes, which are utilized for arc-heating metal, such as steel or the like, in the electric arc furnace or the ladle for receiving the metal discharged from the electric arc furnace.

The cooling of the graphite electrode train is conducted by spraying directly the outer surface of the graphite electrode with a cooling liquid, which consists mainly of water.

The graphite electrode train have plurality of graphite electrodes vertically connected to each other, via nipple and penetrates through a cover enclosing an opening of the electric arc furnace with a vessel for melting and refining the metal, such as steel or the like. The graphite electrode train extends into the vessel.

In the case of cooling as above, the cooling liquid to be sprayed is directed at the upward or downward inclination of 0 degree to 60 degrees with respect to the horizontal, while the spraying rate of the cooling liquid is maintained at an optimum flow rate of 8 to 35 liters/minute.

The optimum flow rate of the cooling liquid is decided dependent on the diameter of the graphite electrode to be used.

According to the invention, the metal, such as steel, is molten and refined by utilizing an arc-heating of graphite electrodes, together with cooling the graphite electrodes by spraying directly the cooling liquid onto the graphite electrodes connected successively through nipples. The rate of the cooling liquid to be sprayed onto the peripheral surface of graphite electrode in the upward or downward inclination from the horizontal level is in an optimum range and hence at a position above the furnace cover, the lower portion of the graphite electrodes extending into electric arc furnace are effectively cooled, although the graphite electrodes are affected on arc heating in the arc electric furnace.

Consequently, it is possible to suppress oxidative ablation of the graphite electrodes. Futhermore, a hydrogen gas reaction due to the dissolution of the cooling liquid and the consequent hydrogen gas generation does not occur in the electric arc furnace.

Namely, in the case, in which metal is molten and refined according to the present invention, the cooling liquid with the optimum flow rate thereof is sprayed in the upward or downward inclination angle with respect to the horizontal. Therefore, as to the cooling liquid, the spray thereof with a direction upwardly inclined has in sequence an upward movement, a looping movement and a downward movement. At the end of the downward movement, the cooling liquid comes in contact with the peripheral surface of the graphite electrode. For this reason, while the cooling liquid collides with the peripheral surface and flows down along the peripheral surface, the cooling liquid has lost most of its collision energy, the cooling liquid which is flowing down along the peripheral surface is always in contact with the peripheral surface of the graphite electrode, and thereby even the peripheral surface of the graphite electrode in the arc electrode furnace is cooled.

In the case where cooling liquid is sprayed in the downward direction onto the peripheral surface of the graphite electrode, unlike the case where cooling liquid is sprayed in the horizontal level or in parallel to the horizontal level, most of the cooling liquid makes contact with the peripheral surface of the graphite electrode, the cooling liquid in contact with the peripheral surface of the graphite electrode flows down along the peripheral surface, and the cooling liquid which is flowing down along the peripheral surface is always in contact with the peripheral surface of the graphite electrode, whereby even the peripheral surface and the end of the graphite electrode in the arc electric furnace or ladle can be cooled.

In the arc electric furnace, the cooling liquid which enters the electric furnace or the ladle always flows down along the peripheral surface of the graphite electrode and is in contact with the peripheral surface of the graphite electrode. For this reason, the cooling liquid which enters the electric furnace or the ladle is almost evaporated during flowing down, and thus the generation of hydrogen gas due to dissolution of the cooling liquid does not occur.

Containment of an anti-oxidant in the cooling liquid prevents effectively oxidative ablation of the graphite electrode, because the anti-oxidant contained in the cooling liquid is adhered to the peripheral surface of the graphite electrode during flowing down of the cooling liquid along the peripheral surface of the graphite electrode, and accordingly an anti-oxidant film is formed.

Further, the amount or rate of cooling liquid to be sprayed is limited to a prescribed suitable range. For this reason, even if a part of cooling liquid enters the arc electric furnace, most of cooling liquid is evaporated during flowing down, the dissolution of the cooling liquid does not occur and no hydrogen gas is generated.

As described above, such cooling does not cause an-entrance of hydrogen gas into molten metal, such as molten steel, and even a type of steel which is apt to be easily broken or cracked due to hydrogen brittleness can be molten and refined easily.

Also even in the case where arc heating by a graphite electrode is used for melting and refining in a ladle, cooling liquid flows down stratifiedly along the peripheral surface of the graphite electrode. Even if cooling liquid enters the ladle through the furnace cover of the ladle, the cooling liquid is evaporated and dissipated by the internal heat, there is no room for occurrence of a dissolution of the cooling liquid, and hydrogen gas generated from the dissolution of the cooling liquid will not enter so as to be dissolved in molten steel.

In detail, the surface of molten steel in a ladle is covered with slag, and the end of a graphite electrode is submerged into the slag layer existing on the molten metal pool and served for arc heating of the slag layer, which cause a heating of the molten metal pool. In other words, the space between the slag layer and furnace cover is heated to a significantly high temperature by radiant heat transfer resulted from the arc heating.

Therefore, even if a part of cooling liquid enters a ladle, the cooling liquid is immediately evaporated and dissipated, and even if un-dissipated cooling liquid remains, the cooling liquid remaining in the ladle is protected by the slag layer, and thereby the cooling liquid will never enter the molten steel pool. Further, hydrogen gas generated in this case will never be dissolved into the molten steel pool owing to the shield of the slag layer existing on the molten metal pool.

Further, when tight quality is required, molten steel in a ladle can be thereafter subjected to de-gassing treatment as it is, and when de-gassing treatment is applied in combination, cooling liquid is allowed to enter during cooling of a graphite electrode to some extent.

BRIEF DESCRIPTION OF THE ATTACHED DRAWINGS

BEST FORMS OF CARRYING OUT THE INVENTION

As to the best forms of carrying out this invention, the structure, namely means, and operations of the present invention will be described in detail hereinafter referring to the attached drawings.

Figure 2:
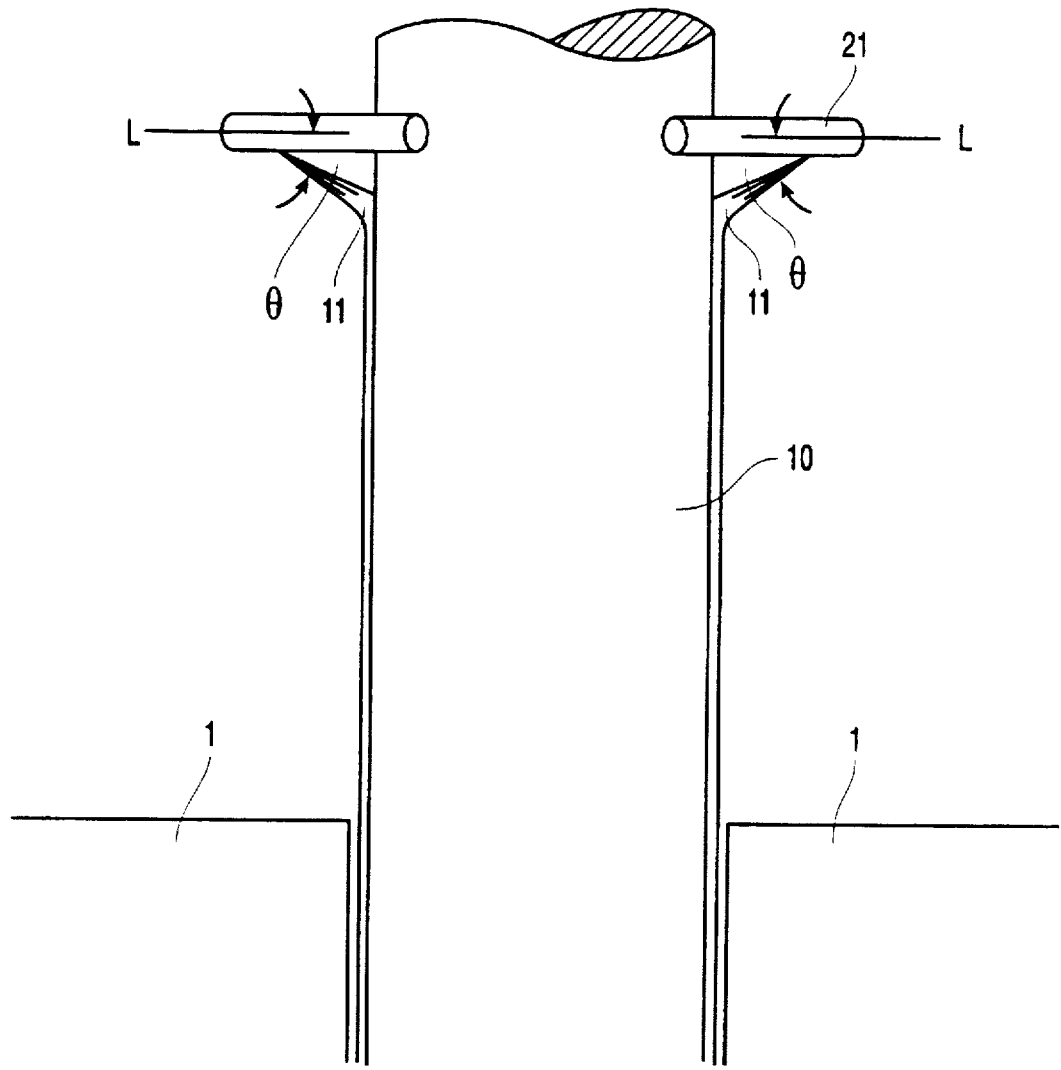
FIG. 2 is an explanative view showing one example carrying out the inventive process by using a prior art cooling pipe.

FIG. 2 is a front view for illustrating one example of metal melting and refining according to the present invention, in which metal is molten and refined with cooling by spraying cooling liquid onto a graphite electrode.

Figure 1:
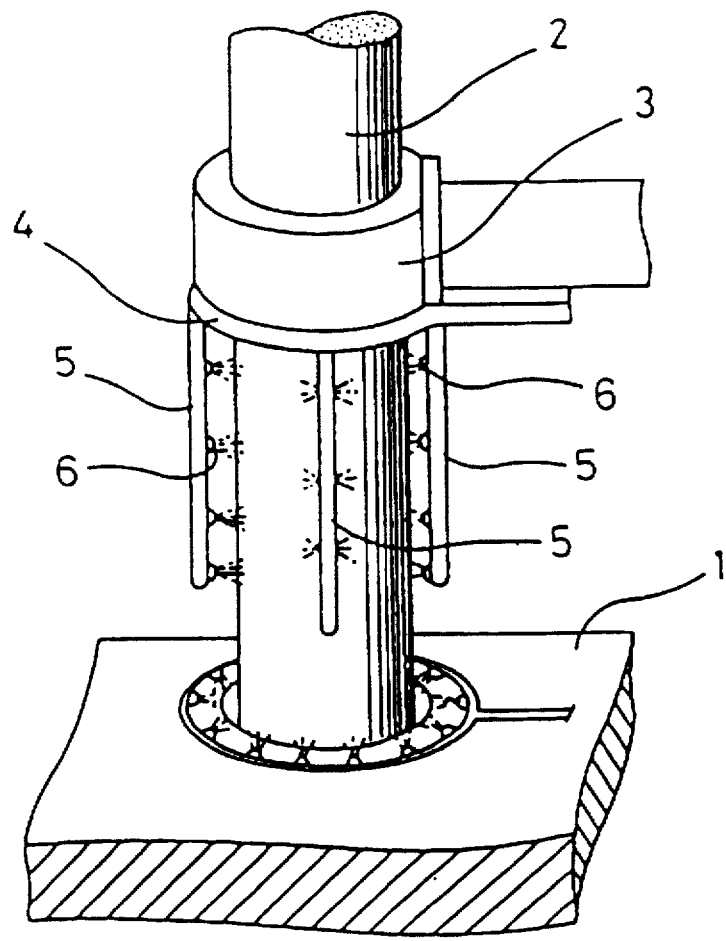
FIG. 1 is a perspective view showing a prior art cooling apparatus used for cooling the graphite electrode.

In FIG. 2, reference numeral 10 represents a graphite electrode, which is connected successively through nipples (not shown) to form a series of graphite electrode train, in other words, a vertical succession of graphite electrodes. In the graphite electrode train, the top portion of the graphite electrode 10 above a furnace cover 1 for enclosing an opening of a vessel of the furnace is held by an electrode holder, which is not shown in FIG. 2, but is shown as numeral 3 in FIG. 1. The graphite electrode, which constitutes the lower part of a graphite electrode of the graphite electrode train is inserted into an arc electric furnace, which is not shown in FIG. 2 and is enclosed by the furnace cover 1. In the arc electric furnace, arc heating is conducted by supplying an electric current through the graphite electrode 10 and melting and refining such as steel making are operated.

When an arc electric furnace is heated using three-phase AC electric power, three graphite electrode trains formed by connecting successively graphite electrode 10 through nipples corresponding to three-phase electric power are provided with an interval on some circle with a prescribed radius extending from the center to the circumference thereof.

When an arc electric furnace is heated by using DC power instead of AC power, one graphite electrode train is disposed and utilized, which is formed by connecting graphite electrode 10 through the nipples successively. DC power heating by supplying the electric current enables to supply a heavy current, and to achieve mass melting and refining.

Next, cooling liquid 11, for example, cooling water is sprayed continuously onto the peripheral surface of a graphite electrode 10 above the furnace cover 1 in the upward or downward direction at the inclination $\theta$ in a range from 0 degree to 60 degrees from the horizontal level L—L.

Figure 3:
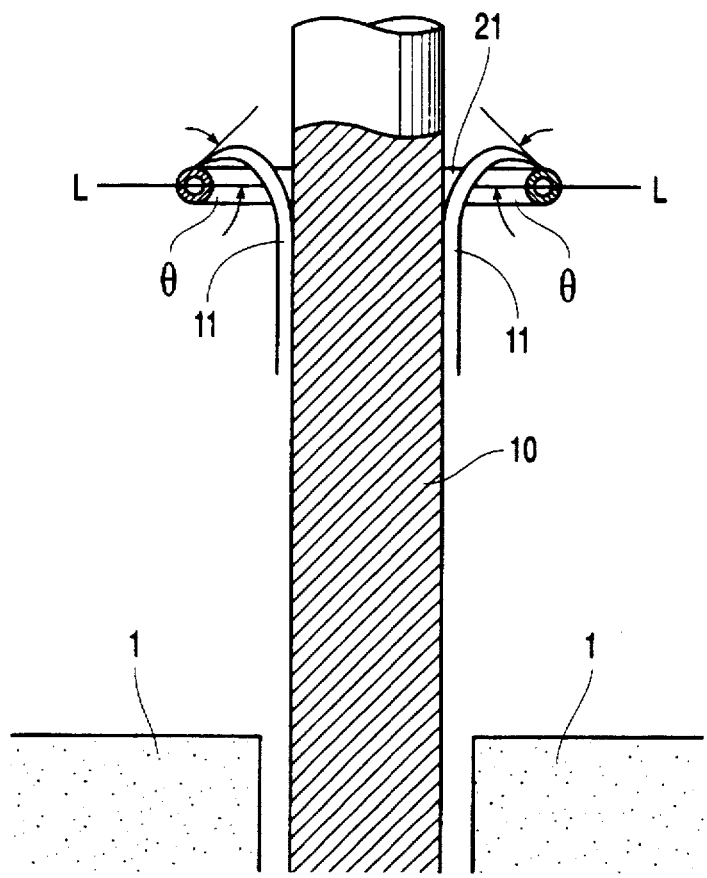
FIG. 3 is other explanative view showing other example carrying out rhe inventive process by using the prior art cooling pipe shown in FIG. 2.

Namely, as shown in FIG. 2, cooling liquid 11 to be sprayed is directed to the downward direction relative to the horizontal level L—L, while, as shown in FIG. 3, cooling liquid 11 to be sprayed is directed to the upward direction relative to the horizontal level L—L.

The amount of spray of cooling liquid in this case is prescribed in relation to the upward or downward inclination $\theta$ and a diameter of the graphite electrode 10 as described hereinafter.

In the case where the upward or downward inclination $\theta$ for spraying cooling liquid 11 is in the range of 60 degrees, more suitably, the upward or downward inclination $\theta$ is in the range from 60 degrees to 10 degrees, the amount of spraying of cooling liquid is in the range from 8 to 35 liters/minute. Namely, even if the cooling liquid 11 to be sprayed at a rate thereof beyond the optimum flow rate is directed upwardly to the inclination angle $\theta$ exceeding 60 degrees, a part of the cooling liquid 11 is splashed without a loping movement and hence a desired cooling effect cannot be obtained.

Additionally, even if the cooling liquid to be sprayed at a rate thereof beyond the optimum flow rate is directed downwardly to the inclination angle exceeding 60 degrees, the flowing down speed of the cooling liquid 11 is high and a partially separated cooling liquid enters into the furnace, so that it causes a water gas reaction to generate hydrogen gas and a local explosion.

Accordingly, it is important that the cooling liquid should be sprayed at the optimum flow rate for the diameter of the graphite electrodes 10 to be used.

The optimum flow rate (liters/minutes) is preferably 8 to 13, 10 to 18, 12 to 20, 14 to 24, 17 to 28, 20 to 33 and 23 to 40 for diameter (inch) of the graphite electrode of 18 inches, 20 inches, 22 inches, 24 inches, 26 inches, 28 inches and 30 inches, respectively.

If the amount of the cooling liquid to be sprayed is in the optimum flow rate selected according to each of the electrode diameters, the electrode consumption rate (kg/t) decreases by 12 to 17%, and also electric power consumption (kg/y) decreases by 3 to 5%, in comparison with a conventional example, which implies the case of cooling by using an ablation electrode.

In the case where the amount of spraying of the cooling liquid is in the optimum flow rate and that the upward or downward inclination angle $\theta$ is in the range described hereinbefore, the electrode consumption rate reaches a minimum value thereof.

Figure 4:
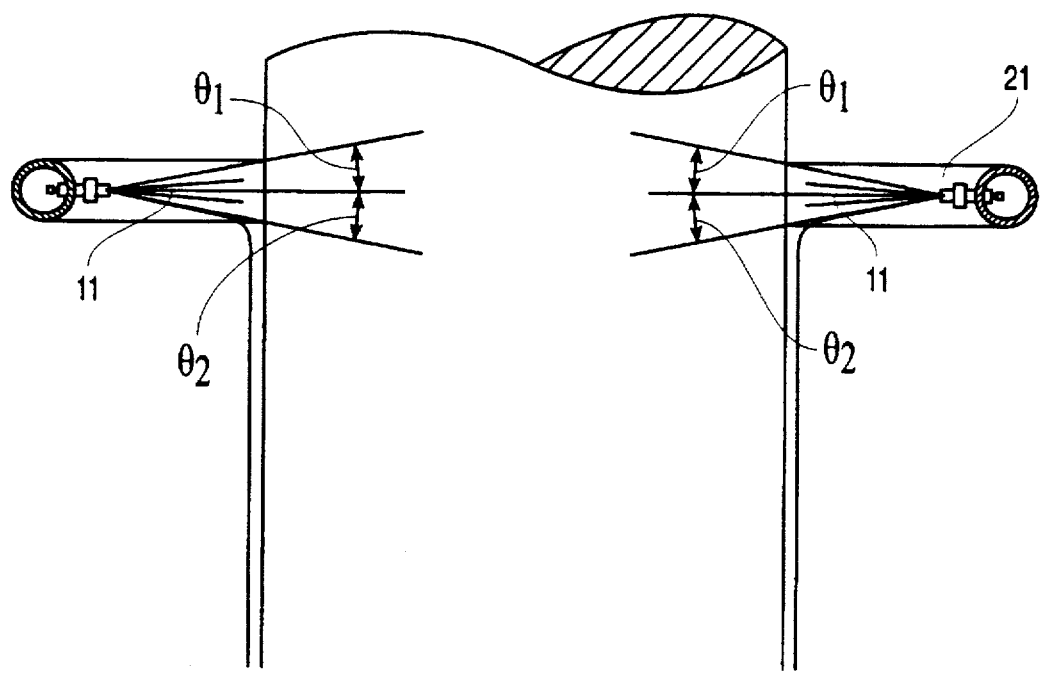
FIG. 4 is other explanative view showing other example carrying out the inventive process by the prior art cooling pipe shown in FIG. 2.

In addition to this, as shown in FIG. 4, the liquid coolant 11 to be sprayed can be directed in the inclination ranging from upwardly inclined angle $\theta_1$ not exceeding 10 degrees to downwardly inclined angle $\theta_2$ of 10 degrees or below.

In the case, in which the cooling liquid 11 is sprayed at the downward inclination of 10 degrees from the horizontal level and in the upward inclination of 10 degrees, the cooling liquid 11 is required to be sprayed at an inclined angles $\theta_1$, $\theta_2$ of $-10$ degrees to $+10$ degrees in inclination or divergent angle in flared shape like trumpet or circular cone. In the case of spraying the liquid coolant 11 in flare shape, it is required to keep the amount or rate of spraying of cooling liquid 11 at the optimum flow rate ranging from 8 to 40 liters/minute. Within the optimum flow rate, the amount of the cooling liquid 11 to be sprayed is determined, in consideration of the electrode diameter of the graphite electrode to be cooled.

The spray shown in FIG. 4 has an optimum flow rate like the above spray. Namely, the optimum flow rate of cooling liquid is 8 to 13 liters/minute for an electrode diameter of 18 inches, namely 450 mm±30 mm; 10 to 18 liters/minute for an electrode diameter of 20 inches, namely 500 mm±30 mm; 12 to 20 liters/minute for an electrode diameter of 22 inches, namely 550 mm±30 mm; 14 to 24 liters/minute for an electrode diameter of 24 inches, namely 600 mm±30 mm; 17 to 28 liters/minute for an electrode diameter of 26 inches, namely 650 mm±30 mm; 20 to 33 liters/minute for an electrode diameter of 28 inches, namely 700 mm±30 mm; 23 to 40 liters/minute for an electrode diameter of 30 inches, namely 750 mm±30 mm.

If the melting and refining of metal, such as steel, is operated by using the cooling liquid spray, the electrode consumption rate (kg/t) decreases by 12 to 19% and the electric power consumption rate (kwh/t) decreases by 3 to 5% in comparison with the conventional example (in case of cooling with a conventional water-cooling ablation electrode).

Figure 5:
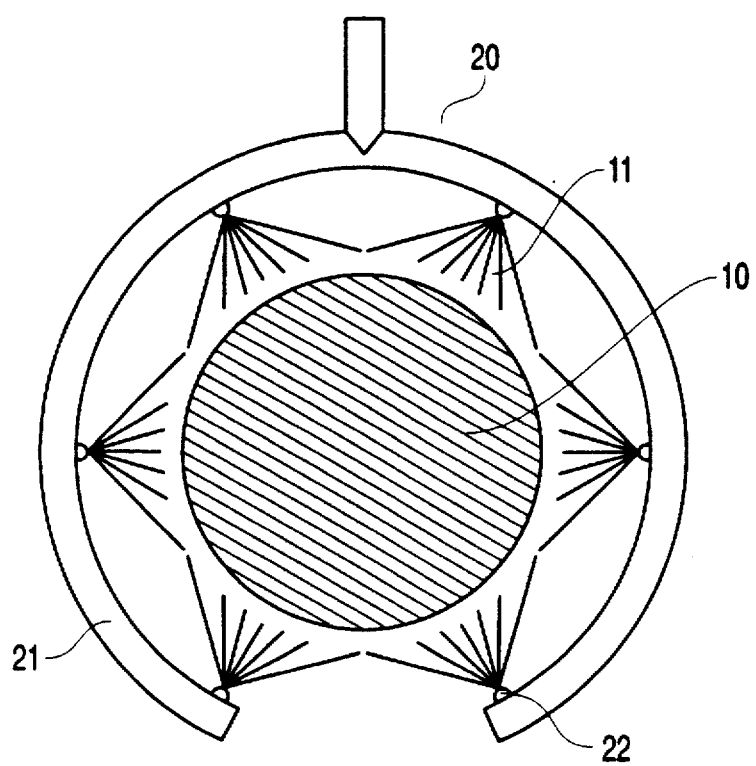
FIG. 5 is a plan view showing the prior art cooling pipe shown in FIGS. 2, 3 and 4.

Though the cooling liquid 11 can be sprayed by any conventional method and apparatus under the conditions described above, the cooling liquid 11 can be sprayed by a conventional apparatus 20, as shown in FIG. 5. The apparatus 20 is described in U.S. Pat. No. 4,941,149, in which a cooling pipe 21 surrounding the periphery of the graphite electrode 10 is provided and the cooling liquid 11 is jetted directory from the cooling pipe 21, as shown in FIG. 5.

In detail, the cooling pipe 21 is provided surrounding the periphery of the graphite electrode 10 to which the cooling liquid 11 is sprayed. The cooling liquid 11 is supplied to the cooling pipe 21, and the cooling liquid 11 is jetted from at least one spray nozzle 22 provided on the inside periphery of the cooling pipe 21 at the upward or downward inclination, as shown in FIGS. 2 and 3. The cooling pipe 21 is provided usually between an electrode holder (shown as numeral 3 in FIG. 1) for holding the top of the upper portion of the graphite electrode 10 and the furnace cover (shown as numeral 1 in FIGS. 2 and 3) of the arc electric furnace.

Spray nozzles 22 provided on the inside periphery of the cooling pipe 21 are directed in the radial direction toward the central axis of the graphite electrode 10, as shown in FIG. 5, and each nozzle 22 is directed in the obliquely upward or obliquely downward direction at the inclination $\theta$, and hence the spray cooling liquid 11 can be sprayed obliquely in the upward or downward direction.

By fixing the spray nozzles 22 so as to be directed in the obliquely upward direction, as shown in FIG. 3, when cooling liquid 11 continuously supplied is jetted in the obliquely upward direction from each nozzle 22 of the cooling pipe 21, the cooling liquid 11 contacts smoothly without problem on the peripheral surface of the graphite electrode 10 after looping as shown in FIG. 3, and flows down along the peripheral surface of the graphite electrode 10. During flowing down of the cooling liquid 11 from the peripheral surface of the upper part of the graphite electrode 10 of the graphite electrode train, the cooling liquid 11 reaches the lower part of the graphite electrode (not shown) which is affected on the refing and melting in the vessel of the furnace, and even the graphite electrode forming the lower part of the graphite electrode train is cooled.

When the spray nozzles 22 are fixed in the obliquely downward direction so that cooling liquid 11 is sprayed in the downward direction, as shown in FIG. 2, the cooling liquid 11 sprayed from the cooling pipe 20 is directed to the graphite electrode 10, which is positioned at the center of the cooling pipe 20, and the cooling liquid 11 flows down along the peripheral surface of the graphite electrode 10 as shown in FIG. 2, and during flowing down of the cooling liquid 11, the cooling liquid 11 cools the graphite electrode 10, and in addition cools even the graphite electrode 10 forming the lower part of the graphite electrode train which is affected on the melting and refining in the vessel of the furnace.

When the amount or rate of the cooling liquid to be sprayed at the upward or downward inclination is the optimum flow rate, most of the cooling liquid 11 is free from splash-ing thereof and in consequence most of the cooling liquid 11 flows down on the peripheral surfaces of the graphite electrode train and enters the arc electric furnace to cool even the end of the lower part of the graphite electrode train.

Further, if the flow rate of cooling liquid 11 is 8 liters/ minute or below, the amount or rate of spraying of cooling liquid 11 is insufficient even if the upward or downward inclination θ is in the range described above, and as a result a desired effect can not be obtained.

On the contrary, if the flow rate of cooling liquid 11 exceeds 40 liters/minute, the graphite electrode train is cooled to an excessive degree along the whole length thereof. Consequently, this causes a requirement for extra electric power for compensational heating of excessive cooling zone. Thereby the electric power consumption rate falls in remarkable degree and it is unpreferable. The furnace cover is damaged by excessive cooling liquid, and its durability is reduced significantly.

As described above, the example in which cooling liquid is sprayed from a plurality of spray nozzles is shown. However, the cooling liquid may be sprayed from a single spray nozzle so far as the cooling liquid is sprayed under the condition described above. In this case, the cooling apparatus itself is allowed to be made compact.

In the case, in which the cooling liquid 11 is jetted in fan-fashion with spreading in downward or upward inclination or divergent angle from −10 degrees to +10 degrees, each spray nozzle 22 provided on the inside periphery of the cooling pipe 21 is structured in such a manner as to spray the cooling liquid 11 by fan-fashioned style, such as a divergent nozzle or the like. In case of spraying in this way, though cooling liquid 11 to be sprayed includes partially parallel flow of the cooling liquid 11, and has the jetting energy generated during colliding with the graphite electrode 10, most of such energy is lost owing to the fact that it is overcome by the inclined flows enclosing the paralled flow of the cooling liquid from opposite sides thereof. The cooling liquid 11 flows down slowly along the peripheral surface of the graphite electrode 10 as shown in FIG. 4, and during flowing down of the cooling liquid 11, the graphite electrode 10 is cooled, and even the lower end of the graphite electrode 10, which corresponds to the lower part of the graphite electrode train and is affected on the refining and melting in the furnace, is cooled.

In this case, also, it is required to maintain the amount or rate of spraying in the suitable range of 8 to 40 liters/minute, and further the optimum flow rate is determined according to the diameter of the graphite electrode to be used, and then the graphite electrode is cooled by spraying cooling liquid with the optimum rate. When the graphite electrode is cooled as described above, the cooling liquid 11 is splashed partially, but the splashing is not so serious as it causes some problem. The cooling liquid 11 flows down on the peripheral surface of each graphite electrode 10 of the graphite electrode train, and then enters the arc electric furnace, and cools even the end of the graphite electrode, which forms the lower part of the graphite electrode train. The graphite electrode is cooled suitably without cooling to the excessive degree, and the electrode consumption rate is reduced significantly.

In this case, the fan fashioned divergent angle or inclination is limited to the range from −10 degrees to +10 degrees, because if the divergent angle is larger than this range, the jetting pressure of the spraying from spraying nozzles decreases significantly, and the flow rate of cooling liquid 11 can not be maintained in the range described above, and further a holding effect for holding the central parallel flow by inclined flows is not exhibited, resulting in the increased splashing of cooling liquid.

The lower limit of the optimum flow rate range of cooling liquid is 8 liters/minute, because if the flow rate is less than 8 liters/minute, the flow rate of cooling liquid is insufficient, resulting in an insufficient cooling effect.

If the flow rate of cooling liquid exceeds the upper limit of the suitable range of 40 liters/minute, cooling of the whole graphite electrode train is excessive even if the diameter of the graphite electrode 10 is significantly large. On the contrary, extra electric power is needed for compensational heating of the excessive cooling, and thereby the electric power unit requirement increases unpreferably.

According to the invention, the graphite electrode to be used for arc-heating of molten metal in the ladle may be cooled by spraying the cooling liquid.

Figure 6:
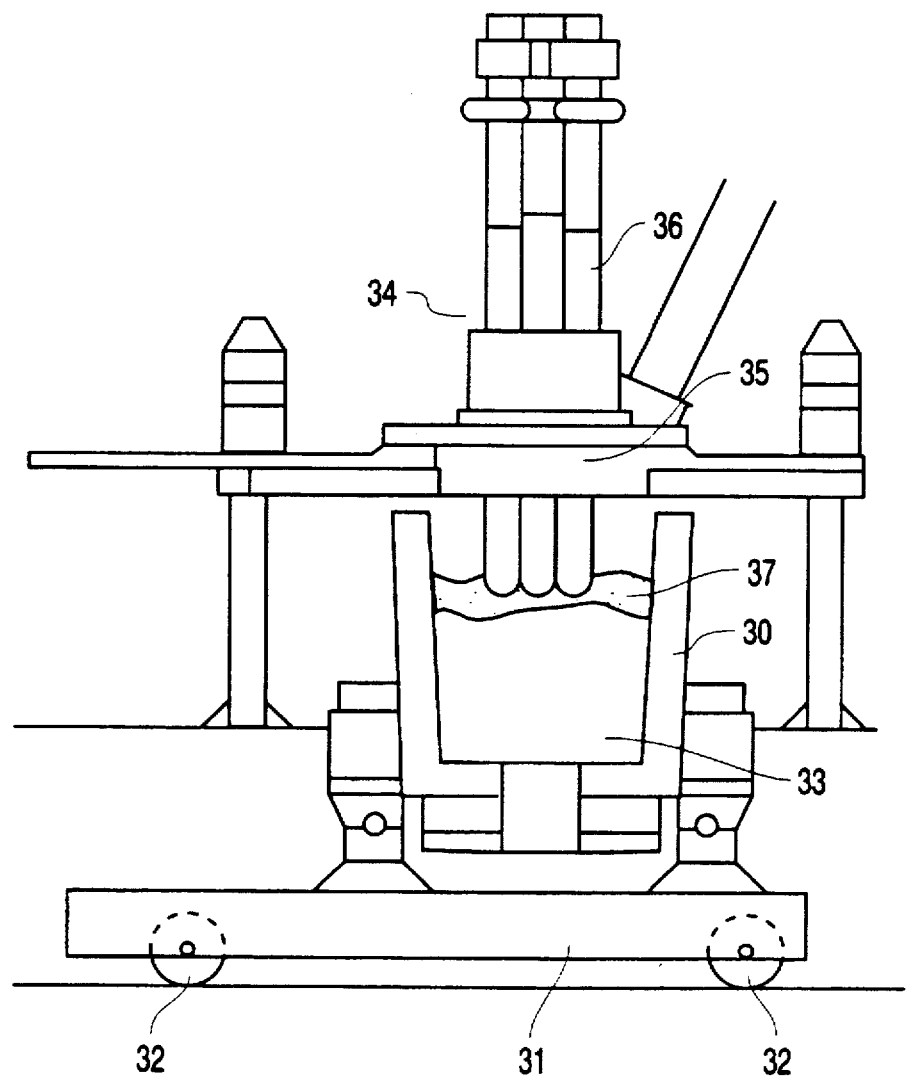
FIG. 6 is an explanative view showing a ladle used for carrying out the inventive process.

In FIG. 6, referen numeral 30 shows a ladle, which is put on a carriage 31 with wheels 32. The ladle 30 receives a molten metal discharged from the electric arc furnace, and moves to a secondarily melting and refining apparatus 34.

The apparatus 34 is provided with a furnace cover 35, which enables to move upwardly and downwardly, and through which is penetrated a vertical train of graphite electrodes 36 connected to each other by nipples.

The graphite electrode 36 consisting of a lower part of the graphite electrode train has a lower end submerged into a slag layer 37 exisiting on a molten metal pool 33.

When the ladle 30 has a brief stop at a position beneath the furnace cover 35, the furnace cover 35 moves downwardly so as to enclose an opening of the ladle 30. The ladle 30 serves to conduct secondary melting and refining of the molten metal pool 33, by utilizing the arc-heating due to the graphite electrodes 30.

During such secondary melting and refining, at least one graphite electrode 30 of electrode train is cooled by spraying the cooling liquid (not shown in FIG. 6) on the peripheral surface of the graphite electrode 30 in the upward or downward inclination with a angle not exceeding 60 degrees.

The rate of spraying of the cooling lequid is in a range from 2 liters/minute to 10 liters/minute, preferably 3 liters/minute to 9 liters/minute.

Namely, the spraying rate not exceeding 2 liters/minute can not carry out an efficient cooling effect with a fall in a certain degree of the electrode consumption rate, even if the inclination of the cooling liquid to be sprayed is in an optimal range. On the contrary, the spraying rate exceeding 10 liters/minute causes a cooling effect in excess of the type of the graphite electrode used for secondarily melting and refining by using the ladle, and a consequence rise of electric power consumption due to a demand for excessive electric power.

EXAMPLE 1

Various samples of graphite electrodes as in Table 1 were used to melt and refine scrap materials by electric arc heating in an electric arc furnace. Each of the upper graphite electrodes of sample Nos. 1 to 8 was cooled by spraying the cooling liquid on the outer surface of the graphite electrode in the downward inclination with angles of 15 and 20 degrees, by using the cooling pipe 21 as shown in FIG. 5.

The cooling liquid consists mainly of water and was sprayed at a position upper the furnace cover.

The spraying rate of the cooling liquid was adjusted in accordance with diameter of graphite electrode to be used. Thereby the electrode consumption rate and electric power consumption rate with respect to the electrode diameter and the spraying rate were obtained.

The results were shown in the Table 1.

As to each of 8 types of graphite electrodes with diameters different to each other, the relation between electrode consumption rate and electric power consumption rate was obtained.

In accordance with thus obtained relation, the spraying rate enabling to obtain the optimum result in the consumption rates of electrode and electric power was determined so as to meet the optimum spraying rate.

The spraying rate not exceeding the optimum spraying rate was determined as the minimum spraying rate.

The spraying rate exceeding the optimum spraying rate was determined as the maximum spraying rate.

Next, in the range of optimum spraying rate of the cooling water, electrode consumption rate in respect to each of 8 electrodes (corresponding to Samples Nos. 1 to 8 of table 2) was obtained. The results are shown in the table 2.

TABLE 2

| Sample No. | I inch | J kg/t |
|---|---|---|
| 1 | 16 | 2.5 |
| 2 | 18 | 1.9 |
| 3 | 20 | 2.1 |
| 4 | 22 | 1.9 |
| 5 | 24 | 1.7 |
| 6 | 26 | 1.5 |
| 7 | 28 | 1.2 |
| 8 | 30 | 1.6 |

The table 2 shows electrode consumption rate corresponding to the optimum spraying rate, and has therein reference numerals I and J, which are following.

I: Diameter of graphite electrode.

J: Electrode consumption rate obtained by spraying the cooling water in a downward inclination between 10 and 35 degrees.

The table 2 shows that the spraying rate beyond the range of the optimum spraying rate cannot achieve a reduction in

TABLE 1

| Sample No. | A inch | A mm | B liters/min. | C kg/t | D kg/t | E (%) | F kwh/t | G kwh/t | H (%) |
|---|---|---|---|---|---|---|---|---|---|
| 1 | 16" | 400 | 6–9 | 2.5 | 2.8 | 12% | 316 | 325 | 3% |
| 2 | 18" | 450 | 8–12 | 1.9 | 2.2 | 16% | 411 | 431 | 5% |
| 3 | 20" | 500 | 10–14 | 2.1 | 2.4 | 14% | 360 | 374 | 4% |
| 4 | 22" | 550 | 12–17 | 1.9 | 2.2 | 16% | 370 | 389 | 5% |
| 5 | 24" | 600 | 14–20 | 1.7 | 1.9 | 12% | 380 | 399 | 5% |
| 6 | 26" | 650 | 17–24 | 1.5 | 1.8 | 12% | 360 | 378 | 5% |
| 7 | 28" | 700 | 20–28 | 1.2 | 1.4 | 17% | 370 | 381 | 3% |
| 8 | 30" | 750 | 23–32 | 1.6 | 1.8 | 13% | 350 | 368 | 5% |

Reference Numeral A~E of table 1 is following.

A: Size of graphite electrode.
B: Optimum spraying rate.
C: Electrode consumption rate of optimum spraying rate.
D: Electrode consumption rate of minimum spraying rate.
E: Difference between two electrode consumption rates shown in reference numerals C and D.
F: Electric power consumption rate of optimum spraying rate.
G: Electric power consumption rate of maximum spraying rate.
H: Difference between two electric power consumption rates shown in reference numerals F and G.

In the table 1, optimum spraying rate, minimum spraying rate and maximum spraying rate are as followed.

remarkable degree of electrode consumption rate, i.e 2.5 to 1.2 kg/ton, even if the inclination for spraying the cooling liquid ranges between 10 degrees and 35 degrees.

This shows one feature of this invention, because the cost of the electric furnace operation consists mainly of the electrode consumption rate.

EXAMPLE 2

Various samples of graphite electrodes shown in Table 3 were used to melt and refine scrap materials by using electric arc heating in a electric arc furnace.

Each of the electrodes corressponding to samples Nos. 1 to 8 was cooled by spraying the cooling water on the outer surface of the electrode in the downward inclination with angles shown in the table 3.

The cooling water consists mainly of water and was sprayed at a position over the furnace cover.

The terms of spraying with the cooling water were shown in the table 3.

TABLE 3

| Sample No. | $B_1$ liters/min. | $A_1$ inch | $C_1$(kg/t) 80' | 70' | 60–35' |
| --- | --- | --- | --- | --- | --- |
| 1 | 6–9 | 16 | 2.8 | 2.7 | 2.4 |
| 2 | 8–12 | 18 | 2.2 | 2.2 | 1.9 |
| 3 | 10–14 | 20 | 2.4 | 2.4 | 2.1 |
| 4 | 15–20 | 24 | 1.9 | 1.8 | 1.6 |
| 5 | 12–17 | 22 | 2.2 | 2.1 | 1.9 |
| 6 | 17–24 | 26 | 1.8 | 1.7 | 1.5 |
| 7 | 20–28 | 28 | 1.5 | 1.4 | 1.2 |
| 8 | 23–32 | 30 | 1.8 | 1.8 | 1.5 |

Table 3 shows a relation between the inclination to be sprayed and electrode consumption rate with respect to the optimum spraying rate of the cooling water.

Reference Numeral $A_1$–$C_1$ of table 1 is following.
$A_1$: Size of graphite electrode.
$B_1$: Optimum spraying rate of cooling water.
$C_1$: Downward inclination of the cooling water to be sprayed.

The optimum spraying rate in the table 3 was determined in same manner as shown in Example 1.

In the range of optimum spraying rate, electrode consumption rate with respect to diameter of graphite electrodes was obtained. The results are shown in the table 3.

The table 3 teaches that the inclination angle exceeding 60 degree makes an increase in the electrode consumption rate, even if the spraying rate is in optimum range of each of electrodes with diameters different to each other.

EXAMPLE 3

Melting and refining of the scrap materials by using electric arc heating in the electric arc furnace employed a train of the graphite eletrodes connected to each other by nipple.

The graphite electrode train was cooled by spraying the cooling liquid, which was jetted in a divergent fashion with upward inclination angle $\theta_1$ and $\theta_2$ of 0 degree to 10 degree.

Rate of spraying of the cooling liquid was adjusted so as to meet diameter of the graphite electrode. The consumption rates of the electrode and electric power with respect to electrode diameter and spraying rate of the cooling liquid was obtained. The results are shown in the table 4.

Reference Numeral A–E of table 4 is following.
$A_3$: Size of graphite electrode.
$B_3$: Optimum spraying rate.
$C_3$: Electrode consumption rate of optimum spraying rate.
$D_3$: Electrode consumption rate of minimum spraying rate.
$E_3$: Difference between two electrode consumption rates shown in reference numerals C and D.
$F_3$: Electric power consumption rate of optimum spraying rate.
$G_3$: Electric power consumption rate of maximum spraying rate.
$H_3$: Difference between two electric power consumption rates shown in reference mumerals $F_3$ and $G_3$.

The table 5 shows the optimum spray rate, the minimum spraying rate and maximum spraying rate, which are determined by same manner as shown in Example 1.

TABLE 5

| Sample No. | $K_3$ liters/min. | $I_3$ inch | $J_3$ −10°–0° | 0–+10° |
| --- | --- | --- | --- | --- |
| 1 | 9 | 16 | 2.6 | 2.5 |
| 2 | 12 | 18 | 2.0 | 2.1 |
| 3 | 14 | 20 | 2.2 | 2.2 |
| 4 | 16 | 22 | 1.9 | 1.9 |
| 5 | 20 | 24 | 1.8 | 1.8 |
| 6 | 24 | 26 | 1.6 | 1.6 |
| 7 | 28 | 28 | 1.3 | 1.3 |
| 8 | 32 | 30 | 1.7 | 1.6 |

The table 5 shows $K_3$, $I_3$ and $J_3$ which are following.
$K_3$: Spraying rate of cooling water.
$I_3$: Diameter of graphite electrode.
$J_3$: Electrode consumption rate obtained by spraying the cooling water in a downward inclination of −10 degrees to 0 degree and in an upward inclination of 0 degree to 10 degrees.

Next, the colling water in an optimum spraying rate was sprayed to he graphite electrode in a divergent fashion with downward and upperward inclination angles of 0 to 10 degrees, thereby obtaining a relation between the electrode consumption rate and the inclination angle, which is shown in Table 6.

EXAMPLE 4

The cooling test was conducted in same manner as shown in Example 1, without spraying the cooling liquid in the downward inclination.

In the cooling test, the cooling liquid was sprayed in the upward inclination with angles equal to 15 degrees and 20 degrees, respectively.

TABLE 4

| Sample No. | $A_3$ inch | mm | $B_3$ liters/min. | $C_3$ kg/t | $D_3$ kg/t | $E_3$ (%) | $F_3$ kwh/t | $G_3$ kwh/t | $H_3$ (%) |
| --- | --- | --- | --- | --- | --- | --- | --- | --- | --- |
| 1 | 16" | 400 | 8–11 | 2.5 | 2.9 | 17% | 322 | 335 | 4% |
| 2 | 18" | 450 | 11–13 | 2.1 | 2.4 | 16% | 419 | 444 | 6% |
| 3 | 20" | 500 | 14–18 | 2.2 | 2.5 | 14% | 367 | 385 | 5% |
| 4 | 22" | 550 | 16–20 | 1.9 | 2.2 | 16% | 377 | 396 | 5% |
| 5 | 24" | 600 | 18–24 | 1.6 | 1.9 | 19% | 388 | 411 | 6% |
| 6 | 26" | 650 | 22–28 | 1.6 | 1.8 | 15% | 367 | 389 | 6% |
| 7 | 28" | 700 | 25–33 | 1.3 | 1.5 | 16% | 377 | 392 | 4% |
| 8 | 30" | 750 | 28–40 | 1.7 | 2.0 | 15% | 357 | 375 | 5% |

The cooling test had results shown in the tables 6 and 7.

TABLE 6

| Sample No. | A₄ inch | A₄ mm | B₄ liters/min. | C₄ kg/t | D₄ kg/t | E₄ (%) | F₄ kwh/t | G₄ kwh/t | H₄ (%) |
|---|---|---|---|---|---|---|---|---|---|
| 1 | 16" | 400 | 6–9 | 2.5 | 2.8 | 12% | 316 | 325 | 3% |
| 2 | 18" | 450 | 8–12 | 1.9 | 2.2 | 16% | 411 | 431 | 5% |
| 3 | 20" | 500 | 10–14 | 2.1 | 2.4 | 14% | 360 | 374 | 4% |
| 4 | 22" | 550 | 12–17 | 1.9 | 2.2 | 16% | 370 | 389 | 5% |
| 5 | 24" | 600 | 15–20 | 1.7 | 1.9 | 12% | 380 | 399 | 5% |
| 6 | 26" | 650 | 17–24 | 1.5 | 1.8 | 12% | 360 | 378 | 5% |
| 7 | 28" | 700 | 20–28 | 1.2 | 1.4 | 17% | 370 | 381 | 3% |
| 8 | 30" | 750 | 23–32 | 1.6 | 1.8 | 13% | 350 | 368 | 5% |

TABLE 7

| Sample No. | K₄ liters/min. | L₄ inch | J₄ kg/t |
|---|---|---|---|
| 1 | 9 | 16 | 2.5 |
| 2 | 12 | 18 | 2.0 |
| 3 | 14 | 20 | 2.2 |
| 4 | 17 | 22 | 2.0 |
| 5 | 20 | 24 | 1.7 |
| 6 | 24 | 26 | 1.6 |
| 7 | 28 | 28 | 1.3 |
| 8 | 32 | 30 | 1.6 |

Reference Numeral A₄–J₄ of tables 6 and 7 are following.
A₄: Size of graphite electrode.
B₄: Optimum spraying rate.
C₄: Electrode consumption rate of optimum spraying rate.
D₄: Electrode consumption rate of minimum spraying rate.
E₄: Difference between two electrode consumption rates shown in reference numerals C₄ and D₄.
F₄: Electric power consumption rate of optimum spraying rate.
G₄: Electric power consumption rate of maximum spraying rate.
H₄: Difference between two electric power consumption rates shown in reference numerals F₄ and G₄.
K₄: Spraying rate of cooling water in the optimum range.
L₄: Diameter of graphite electrode.
J₄: Electrode consumption rate obtained by spraying the cooling water in an upward inclination of 10 degrees to 35 degrees.

EXAMPLE 5

The cooling test was conducted in same manner as shown in Example 1, without spraying the cooling liquid in the downward inclination.

In the cooling test, the cooling liquid was sprayed in the upward inclination with angles from 35 degrees to 80 degrees, respectively.

The cooling test had results shown in the table 8.

TABLE 8

| Sample No. | K₅ liters/min. | I₅ inch | J₅(kg/t) 80' | J₅(kg/t) 70' | J₅(kg/t) 60–35' |
|---|---|---|---|---|---|
| 1 | 6–9 | 16 | 2.9 | 2.7 | 2.4 |
| 2 | 8–12 | 18 | 2.3 | 2.1 | 1.9 |
| 3 | 10–14 | 20 | 2.4 | 2.3 | 2.1 |
| 4 | 15–20 | 24 | 1.9 | 1.9 | 1.6 |
| 5 | 12–17 | 22 | 2.2 | 2.1 | 1.9 |
| 6 | 17–24 | 26 | 1.8 | 1.7 | 1.5 |
| 7 | 20–28 | 28 | 1.6 | 1.5 | 1.2 |
| 8 | 23–32 | 30 | 1.8 | 1.8 | 1.5 |

The table 8 shows K₅, I₅ and J₅ which are following.
K₅: Spraying rate of cooling water in the optimum state.
I₅: Diameter of graphite electrode.
J₅: Electrode consumption rate obtained by spraying the cooling water in a downward inclination from 80 degrees to 35 degrees.

EXAMPLE 6

The cooling test was conducted by using the ladle shown in FIG. 6. The way of the cooling test is same as the combination of the ways shown Examples 1 and 4.

The result of spraying the cooling liquid in the downward and upward inclinations with an angle of 20 degrees is shown in Table 9.

TABLE 9

| Sample No. | A₆ inch | L | M | N | O (liters/min.) |
|---|---|---|---|---|---|
| 1 | 12" | 0.50 kg/t | 0.43 kg/t | 14% | 4–5 |
| 2 | 14" | 0.15 kg/t | 0.12 kg/t | 20% | 5–6 |
| 3 | 16" | 0.35 kg/t | 0.30 kg/t | 14% | 6–7 |
| 4 | 18" | 0.40 kg/t | 0.35 kg/t | 13% | 7–8 |

In the table 9, terms A₆ to O are following.
A₆: Size of graphite electrode to be used.
L: Electrode Consumption Rate of the conventional ladle refining process.
M: Electrode Consumption Rate of the present invention.
N: Improvement of electrode consumption rate, by comparison between this invention process and the conventional ladle refining process.
O: Spraying rate of the cooling water.

What is claimed is:
1. A method for cooling a vertical train comprised of graphite electrodes with diameter of 18 to 30 inches connected to each other and which penetrates through a cover for enclosing an open portion of an electric arc furnace or a ladle for melting and refining metal, said method comprising spraying a cooling liquid at an optimum flow rate on an outer surface of said vertical train by directing said cooling liquid in an upwardly or a downwardly inclined direction with angle of 0 to 60 degrees, wherein said optimum flow rate (liters/minutes) is 8 to 13, 10 to 18, 12 to 20, 14 to 24, 17 to 28, 20 to 33 and 23 to 40 for the diameter of said graphite electrode of 18 inches, 20 inches, 22 inches, 24 inches, 26 inches, 28 inches and 30 inches, respectively.

2. A method according to claim 1, in which said upward or downward inclination ranges between 10 degrees and 35 degrees.

3. A method according to claim 1, in which said upward or downward inclination ranges between 35 degrees and 60 degrees.

4. A method according to claim 1, in which said upward or downward inclination ranges from the horizontal level to 10 degrees, and said cooling liquid is sprayed by a divergent fashion.

* * * * *